United States Patent
Shapira et al.

(10) Patent No.: US 9,553,919 B2
(45) Date of Patent: Jan. 24, 2017

(54) TECHNIQUES FOR SHARING APPLICATION STATES

(71) Applicant: Quixey, Inc., Mountain View, CA (US)

(72) Inventors: Liron Shapira, Mountain View, CA (US); Jonathan K. Lerner, San Jose, CA (US); Matthew T. Elder, Los Altos, CA (US)

(73) Assignee: Quixey, Inc., Mountain View, CA (US)

( * ) Notice: Subject to any disclaimer, the term of this patent is extended or adjusted under 35 U.S.C. 154(b) by 326 days.

(21) Appl. No.: 13/954,874

(22) Filed: Jul. 30, 2013

(65) Prior Publication Data
US 2014/0244786 A1 Aug. 28, 2014

Related U.S. Application Data

(60) Provisional application No. 61/769,945, filed on Feb. 27, 2013.

(51) Int. Cl.
*H04L 29/08* (2006.01)

(52) U.S. Cl.
CPC .............. *H04L 67/10* (2013.01); *H04L 67/02* (2013.01)

(58) Field of Classification Search
CPC ................................. H04L 67/10; H04L 29/08
See application file for complete search history.

(56) References Cited

U.S. PATENT DOCUMENTS

| | | | |
|---|---|---|---|
| 8,171,137 B1 | 5/2012 | Parks et al. | |
| 8,640,093 B1 * | 1/2014 | Gill et al. | 717/120 |
| 2004/0122925 A1 * | 6/2004 | Offermann | 709/223 |
| 2005/0066037 A1 | 3/2005 | Song et al. | |
| 2007/0106721 A1 * | 5/2007 | Schloter | 709/200 |
| 2008/0201307 A1 * | 8/2008 | Swartz | 707/3 |
| 2010/0017461 A1 | 1/2010 | Kokkevis et al. | |
| 2010/0274869 A1 | 10/2010 | Warila et al. | |
| 2011/0314389 A1 | 12/2011 | Meredith et al. | |
| 2011/0320475 A1 | 12/2011 | Iwuchukwu | |

(Continued)

OTHER PUBLICATIONS

Wursch et al., "Fostering Synergies—How Semantic Web Technology could influence Software Repositories", May 1, 2010, ACM 978-1-6058-962-6/10/05. p. 45-48.*
Perez, Depplink.me Lets Mobile Users Navigate Through a "Web", TechCrunch, May 22, 2013.*

(Continued)

*Primary Examiner* — Brian J Gillis
*Assistant Examiner* — Amy Ling
(74) *Attorney, Agent, or Firm* — Harness, Dickey & Pierce, PLC

(57) ABSTRACT

Techniques for sharing application states are disclosed. According to one aspect of the disclosure, the techniques include receiving a web resource identifier indicating a web address of a web server hosting a web application and including one or more parameters indicating a state of the web application. The techniques also include obtaining an instruction set for generating an application resource identifier, the instruction set being obtained based on a first portion of the web resource identifier. The techniques further include determining one or more parameter values based on the web resource identifier and the instruction set, and generating an application resource identifier based on the instruction set and the one or more parameter values, the application resource identifier being indicative of the state accessed via a native application.

38 Claims, 11 Drawing Sheets

(56) References Cited

U.S. PATENT DOCUMENTS

| | | | |
|---|---|---|---|
| 2012/0221724 A1* | 8/2012 | Chor .......................... | 709/225 |
| 2012/0284247 A1* | 11/2012 | Jiang et al. ................. | 707/706 |
| 2013/0290318 A1 | 10/2013 | Shapira et al. | |
| 2013/0290319 A1 | 10/2013 | Glover et al. | |
| 2013/0290321 A1 | 10/2013 | Shapira et al. | |
| 2013/0290322 A1 | 10/2013 | Prosnitz et al. | |
| 2013/0290344 A1 | 10/2013 | Glover et al. | |
| 2014/0006409 A1 | 1/2014 | Prosnitz et al. | |
| 2014/0201179 A1* | 7/2014 | Chang .............. | G06F 17/30864 707/706 |
| 2014/0365462 A1* | 12/2014 | Chang .............. | G06F 17/30864 707/711 |

OTHER PUBLICATIONS

Perez, Ready for a "Web" of Apps? Quixey Launches AppURL, a New Way to Enable Deep Linking Across Mobile Applications, TechCrunch, Aug. 2, 2013.*

Allan, "Opening Native Map Apps from the Mobile Browser", Dec. 1, 2011, Habanero Consulting, 6 pages.*

Shadid, "Get Your Invoke On: BlackBerry 10 Invocation Framework", Aug. 17, 2012, BlackBerry Development, 3 pages.*

International Search Report and Written Opinion for PCT Application No. PCT/US2014/018733, dated Jun. 24, 2014.

Extended European Search Report for European Application No. 14757403.2, dated Oct. 17, 2016, 8 pages.

Bandelloni, Renata; User Interface Migration of Web Applications with Task Continuity and Platform Adaptation Support; Feb. 2006; 149 pages.

* cited by examiner

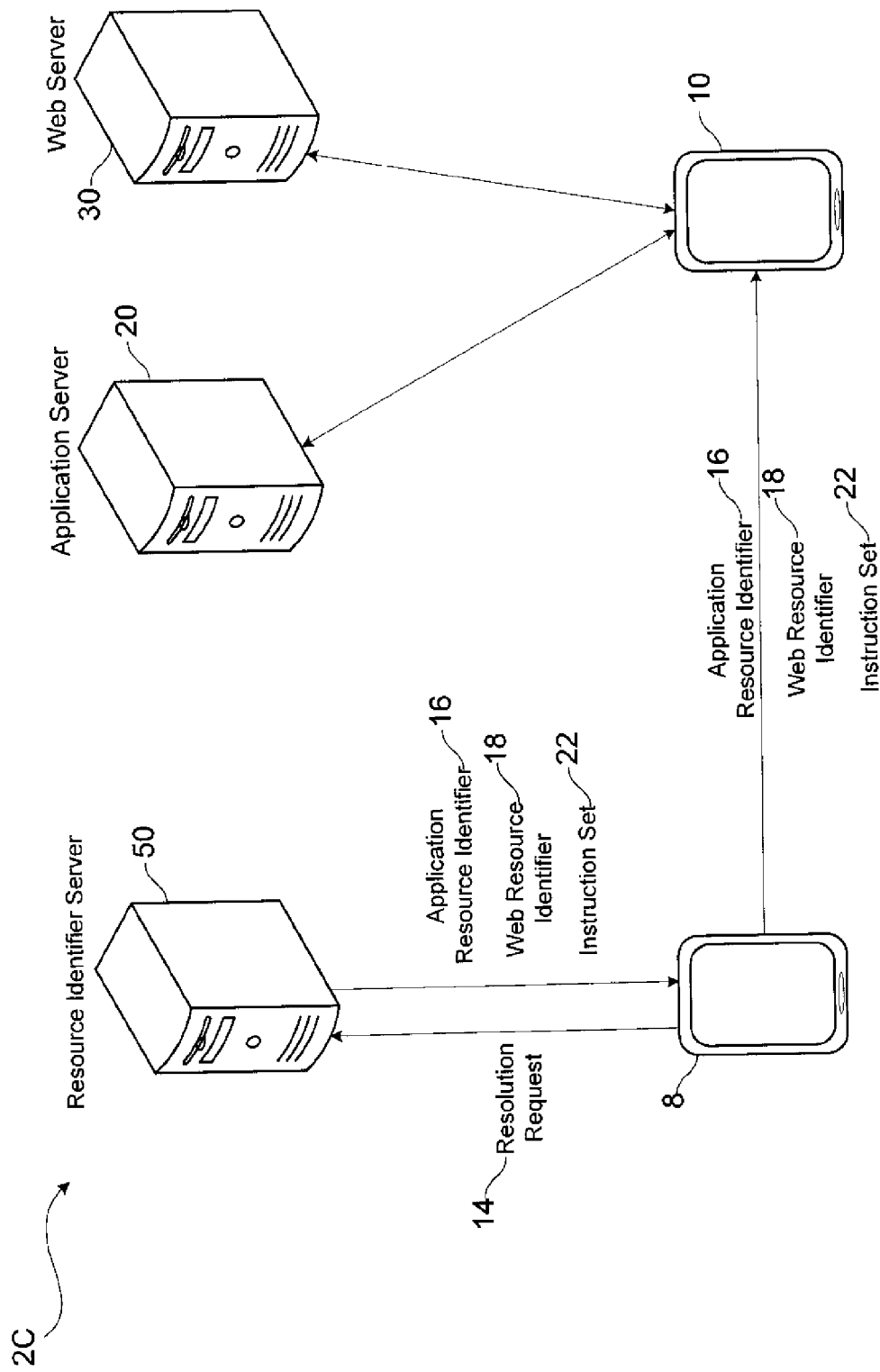

TECHNIQUES FOR SHARING APPLICATION STATES

CROSS-REFERENCE TO RELATED APPLICATIONS

This U.S. patent application claims priority to U.S. Provisional Application 61/769,945 filed on Feb. 27, 2013, the disclosure of which is considered part of the disclosure of this application and is hereby incorporated by reference in its entirety.

TECHNICAL FIELD

This disclosure relates to techniques for sharing application states.

BACKGROUND

A uniform resource locator (URL) is a string of characters that defines a web address of a resource, such as a server. A computing device can accesses the resource using the URL, which is typically resolved to obtain an IP address of the resource. A URL can be static or dynamic. A static URL references a resource having a static state, e.g., a webpage that does not change unless the changes are hard-coded into the code of the webpage. In the event a resource referenced by a static URL is altered, the static URL does not change. A dynamic URL references a resource having dynamic states. A webpage that is database driven or that executes a dynamic script can be referenced by a dynamic URL. For example, a website that offers database driven search functionality may receive search terms from a requesting computing device and provide search results corresponding to the search terms in a dynamic webpage, e.g., a webpage having contents that depend on one or more changing parameters including the search terms. The dynamic URL of such a webpage may include a static portion that references the web server that hosts the webpage and a dynamic or variable portion that describes or references the parameters that were used to generate the contents of the dynamic webpage.

Dynamic URLs allow users to direct other users to a specific state of a resource. For example, if a first user accesses a search engine and searches for "Thai restaurants," the search engine may utilize parameters such as the search terms and a location of the user's computing device to generate the search result. The search results may display results that include Thai restaurants that are in the vicinity of the first user and may generate a dynamic URL that includes the parameters used to determine the search results. In this way, the first user can send the dynamic URL to a second user, who can view the same search results by having a web browser access a webpage using the dynamic URL. In response to the web browser transmitting a web request to the web server referenced in the static portion of the dynamic URL, the web server can perform a search using the parameters identified in the variable portion of the dynamic URL and can provide the search results to the web browser.

DESCRIPTION OF DRAWINGS

FIGS. 2A-2E are drawings illustrating systems for sharing an application state between a sending computing device and a receiving computing device.

Like reference symbols in the various drawings indicate like elements.

DETAILED DESCRIPTION

Mobile computing devices, such as smartphones, tablets, and wearable computers, are quickly becoming the primary devices which users access network resources, e.g., web servers and application servers. Further, many entities are developing multi-platform applications that allows users of mobile computing devices (as well as stationary computing devices) to access the functionality of the application in varying computing environments. A multi-platform application can include one or more "native applications" and one or more "web applications." Native applications are applications that are stored and executed, at least in part, by a mobile or stationary computing device. A "web application" is an application that is executed, at least in part, by a web server and accessed by a web browser of a computing device. For instance, a developer of a multi-platform application can develop native applications designed to be executed by one or more specific operating systems, e.g., iOS by Apple Inc. and ANDROID by Google Inc., and a web application that is executed by a web server and accessed by a web browser of a computing device, such that the native applications and the web application offer the same or similar functionality. Thus in some implementations, the term "multi-platform application" may not reference an actual application, but rather a group of actual applications, e.g., native applications and web applications.

Figure 1:
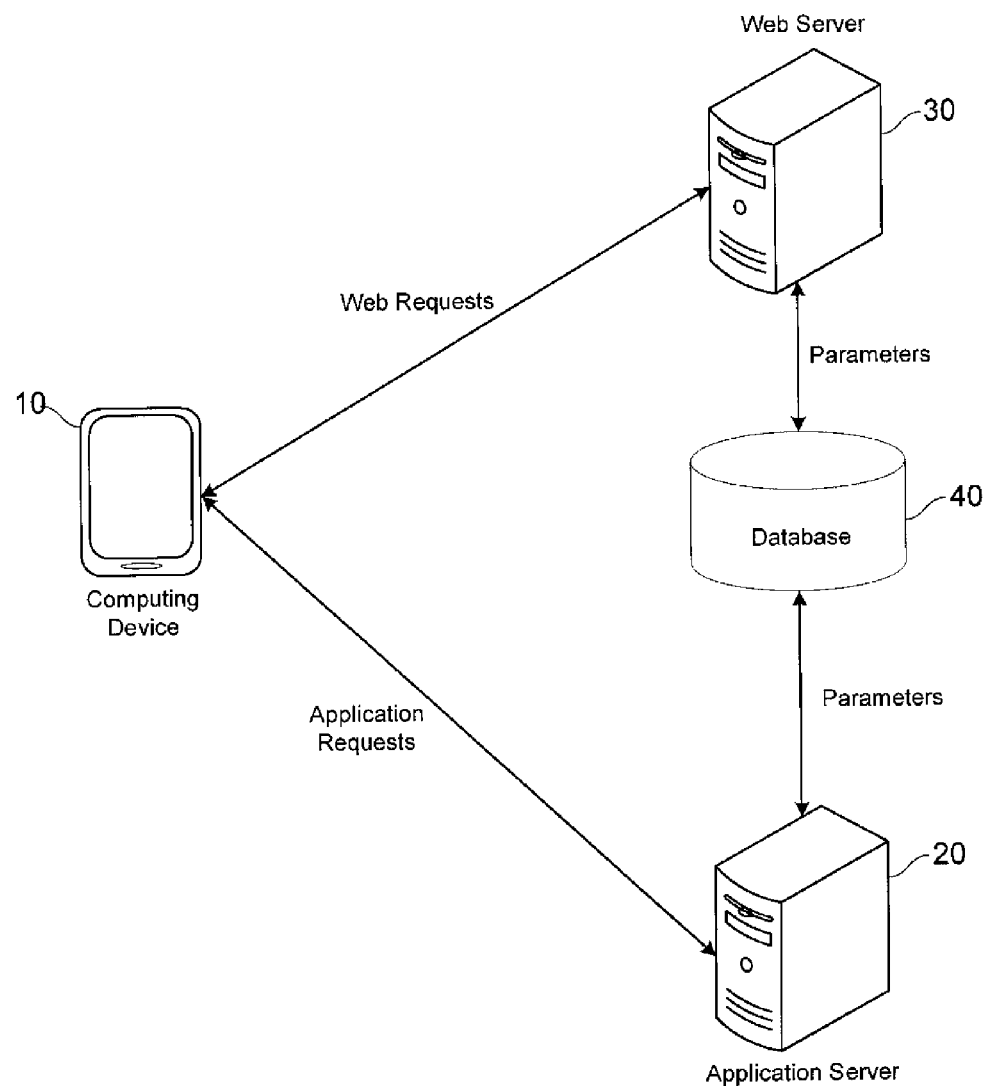
FIG. 1 is a drawing illustrating a computing device configured to execute a native application and a web browser that allows the computing device to access a web application.

FIG. 1 illustrates an example of a computing device 10 configured to execute native applications and a web browser. The web browser allows the computing device 10 to access a web application. In the illustrated example, a business entity may offer users the ability to search for various services and to read customer generated reviews. To provide such functionality, the entity may develop and provide a native application that the user can access directly on the computing device 10 and a web application that the user can access via a web browser of the computing device 10. Using either the native application or the web application, the user can input search terms and can receive results corresponding to the search terms as well as other parameters, such as a location of the computing device 10. When the computing device 10 executes the native application, the native application can transmit an application request that includes the search terms, and any other additional parameters, to an application server 20, which in turn responds to the application request by providing search results.

By way of a web browser of the computing device 10, the user accesses a corresponding web application. In this scenario, the web browser can transmit a web request that includes the search terms, and any other additional parameters, to a web server 30, which in turn responds to the web request by providing search results which are displayed in the web browser. The search results, when displayed in the browser, may be referenced by a dynamic uniform resource locator (URL), whereby the parameters used to determine the search results are indicated in the dynamic URL. In the illustrated example, both the application server 20 and the web server 30 may query a search database 40 with one or more of the received parameters to determine the search results.

The present disclosure relates to techniques for sharing application states between computing devices. For example, in the example of FIG. 1, a user of the computing device 10 may wish to share the search results obtained by the native application, i.e., the state of the native application, with another user. In some implementations, the state of an application is shared in the form of resource identifiers. A resource identifier can include a reference to a native application or a web server that serves a web application and a state of the application, such that the state of the application can be accessed from the native application and/or the web application. As used herein, the term resource identifier can be any character-based, numeric, and/or alphanumeric string that indicates a multi-platform application, a native application, a web application, and/or any other type of application. Examples of resource identifiers include application resource identifiers and web resource identifiers. An application resource identifier includes a reference to a native application and the state of the application. A web resource identifier includes a web address of a web server hosting a web application and the state of the application. An example of a web resource identifier is a dynamic URL. In some implementations, the state of an application can be defined by one or more parameter values that that are indicative of the state. For example, in the context of a search application, the parameter values that define the state can include the search terms and a location of the requesting computing device 10. In the context of a media player application, the parameter values can include a username, a playlist, and/or a media file being played. It is noted that the present disclosure relates to any type of multi-platform application having states that can be represented by one or more parameter values.

Figure 2A:
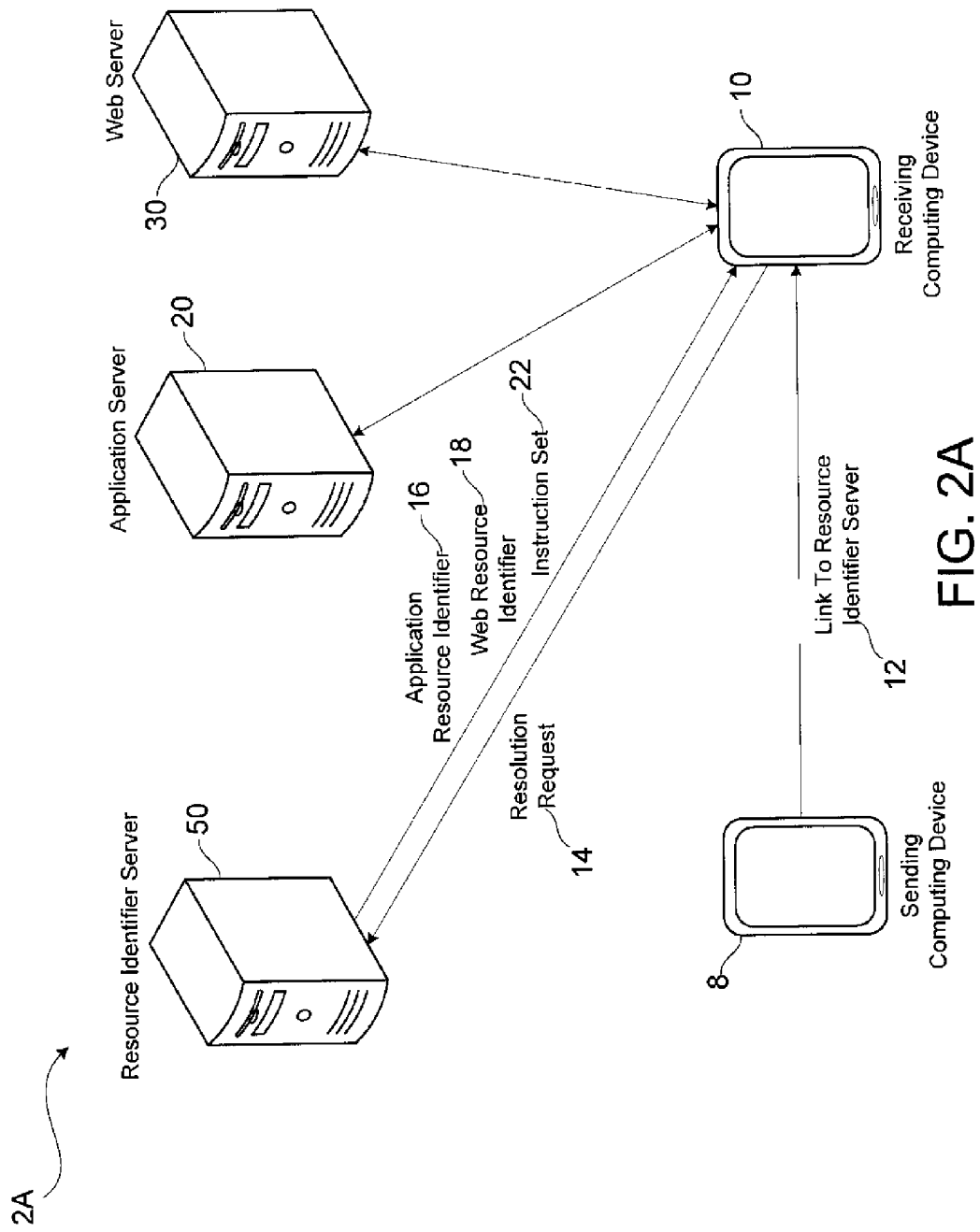

FIG. 2A illustrates an example system 2A for sharing an application state between a sending computing device 8 and a receiving computing device 10. While the illustrated example depicts the sending computing device 8 and the receiving computing device 10 as mobile computing devices, the sending computing device 8 and/or the receiving computing device 10 may be stationary computing devices or any other suitable type of computing devices.

In operation, the user of the sending computing device 8 may desire to share a current state of a native application or a web application. The user can command the sending computing device 8 to capture the current state of the native application or the web application. The user can command the sending computing device 8 to transmit the state to another user or the receiving computing device 10. For example, the user can command the sending computing device 8 to email, SMS message, or otherwise transmit the state of the native or web application to the other user or the receiving computing device 10. In response to such a command, the sending computing device 8 generates a link 12 to a resource identifier server 50. The link 12 can include a web address of the resource identifier server 50 and information corresponding to the multi-platform application and a state thereof. In some implementations, the link 12 is a dynamic URL, whereby the static portion of the dynamic URL is the web address of the resource identifier server 50 and the variable portion contains the information. The information can include a reference to the multi-platform application and one or more parameters indicative of the state. Examples of a reference to the multi-platform application can include a name of the multi-platform application, a pseudonym of the multi-platform application, an abbreviation of the multi-platform application, a domain name associated with the application, and/or a code that uniquely identifies the multi-platform application from other multi-platform applications. The one or more parameters indicative of the state vary depending on the application. For example, the state of a search-based application could include search terms, a username of the user, a location of the sending computing device 8, and/or any other suitable parameters. The state of a video game may include a username, a current level, and/or any other suitable parameters. The state of a music sharing application could include a playlist identifier, names of songs in a playlist, a username, and/or any other suitable parameters.

The sending computing device 8 can capture the state in any suitable manner. In some implementations, the operating system of the sending computing device 8 may include an application programming interface (API) command that allows a native application or a web browser to capture its current state upon receiving such a request from a user. When invoked, the operating system, the native application, or the web browser may capture the current parameters of the application, which are then encoded into the link 12. The API may define a specific format of the link 12, such that all links 12 are generated in a consistent manner.

The sending computing device 8 can then transmit the link 12 to the user (e.g., email) or the receiving computing device 10 (e.g. SMS message). It is noted that transmission to the "user" includes transmission to an account associated with the user, such that the account is accessible from any number of computing devices. While the link 12 is shown as being directly communicated to the receiving computing device 10, there may be additional devices such as email servers, SMS servers, satellites, and/or various networks that may facilitate the transmission of such links to the receiving computing device 10. Additionally or alternatively, the link 12 may be communicated directly to the receiving computing device 10 via a short range transmission protocol, such as Bluetooth® or near-field communication ("NFC").

The receiving computing device 10 receives the link 12 and transmits a resolution request 14 to the resource identifier server 50, the web address of which is provided in the link 12. The resolution request 14 can include the information that was provided in the link 12, such as the reference to the multi-platform application and the one or more parameters defining the captured state of the application. As used herein, the term "resolution request" can include any request to the resource identifier server 50 that requests & one or more resource identifiers and that references an application (e.g., multi-platform application, a native application, or a web application) and the state of the application. The reference to the application and the state of the application may be determined from the link 12.

The resource identifier server 50 receives the resolution request 14 and determines a plurality of resource identifiers corresponding to the multi-platform application based on the information contained in the resolution request 14. In some implementations, the resource identifier server 50 determines one or more application resource identifiers 16 and one or more web resource identifiers 18. An application resource identifier 16 can include a reference to a native application and the one or more parameters indicating the captured state of the multi-platform application. The web resource identifier 18 includes a web address of a web server 30 that hosts the web application and the one or more parameters indicating the captured state. In some implementations, the web resource identifier 18 is a dynamic URL. The resource identifier server 50 further determines an instruction set 22. The instruction set 22 includes instructions that command the receiving computing device 10 to access one of the native application and the web application. For example, the instruction set 22 may cause the receiving computing device 10 to first try to open the native application and if the native application is not found to then try to access the web application at the web server 30. The resource identifier server 50 transmits the application resource identifier 16, the web resource identifier 18, and the instruction set 22 to the receiving computing device 10.

The receiving computing device 10 receives the application resource identifier 16, the web resource identifier 18, and the instruction set 22 and accesses the application in accordance with the instruction set 22. If the instruction set 22 instructs the receiving computing device 10 to first attempt to access the native application, the receiving computing device 10 attempts to launch the native application indicated in the application resource identifier 16. If successful, the receiving computing device 10 may have to provide the one or more parameters to an application server 20 to access the previously captured state on the native application. Some native applications, however, may not require access to an application server 20, such that the captured state can be accessed off-line by the native application using the one or more parameters. If the receiving computing device 10 is unable to launch the native application, the receiving computing device 10 may provide a web request to a web server that includes the one or more parameters based on the web resource identifier. For example, if the web resource identifier is a dynamic URL, the web browser of the receiving computing device 10 may access the web server indicated in the dynamic URL according to known protocols.

An illustrative example of the system 2A according to some implementations of the present disclosure is now described. According to the example, the user of the sending computing device 8 is executing a music player native application called ZYXplayer. In this example, the functionality of ZYXplayer may also be leveraged via a web application that is served from a web server located at the web address www.ZYXplayer.com. If the user wants to send a playlist to which he is currently listening to another user, the user can command the ZYXplayer native application to capture the current state of the application. The ZYXplayer native application can capture the state of the ZYXplayer, including, for example, a username of the user, e.g., John-Doe, and a playlist identifier, e.g., playlist number 1234. The ZYXplayer native application or the operating system of the sending computing device 8 can then generate a link to the resource identifier server 50 based on the application and the state of the application. For example, if the resource identifier server 50 has a domain name of www.appURL.org, the link 12 to the resource identifier server 50 can be "http://www.AppURL.org/mpappinfo?application=zyxplayer&username=JohnDoe&playlistid=1234." The user can command the sending computing device 8 to transmit the link 12 to the other user or the receiving computing device 10 of the other user. For example, the user can "cut and paste" the link 12 into an email or a SMS message or may command the ZYXplayer native application to directly send the link 12 to the user or the receiving computing device 10.

The receiving computing device 10 receives the link 12 and transmits a resolution request to the resource identifier server 50. In this example, the resolution request can include a reference to "ZYXplayer," a username parameter of "John-Doe," and a playlist parameter of "1234." In some implementations, the resolution request can include additional information, such as the operating system type of the receiving computing device 10.

The resource identifier server 50 generates two or more resource identifiers based on the information received in the resolution request. The resource identifier server 50 can generate one or more application resource identifiers 16 that identify known ZYXplayer native applications and one or more web resource identifiers that identify ZYXplayer web applications. For instance, the resource identifier server 50 can generate the following example application resource identifiers 16: "ZYXplayer::iOS::username=JohnDoe&playlist=1234" and "ZYXplayer::ANDROID::username=JohnDoe&playlist=1234." In this example, the application resource identifiers 16 reference iOS and ANDROID versions of the native application. In some implementations, however, the resource identifier server 50 may be configured to generate only a single application resource identifier corresponding to the operating system of the receiving computing device 10. The resource identifier server 50 further generates the following example web resource identifier 18: http://www.ZYXplayer.com/state?username=JohnDoe&playlistid=1234. In this way, the resource identifier server 50 has generated resource identifiers that the receiving computing device 10 can utilize to access the functionality of the ZYXplayer multi-platform application to obtain playlist 1234 of JohnDoe.

The resource identifier server 50 is further configured to determine an instruction set 22 to send to the receiving computing device 10. In this example, the instruction set 22 may be a set of JavaScript instructions instructing the receiving computing device 10 to determine its operating system and then open the native application identified by the application resource identifier 16 corresponding to its operating system. The instruction set 22 may further instruct the receiving computing device 10 to transmit a web request to the web address identified in the web resource identifier 18 if the receiving computing device 10 is unable to open the native application.

The resource identifier server 50 transmits the application resource identifiers 16, the web resource identifier 18, and the instruction set 22 to the receiving computing device 10. The receiving computing device 10 can execute the instruction set 22, thereby first attempting to launch the ZYXplayer native application. If the receiving computing device 10 successfully launches the ZYXplayer native application, the receiving computing device 10 can then attempt to retrieve playlist 1234 of JohnDoe from the ZYXplayer application server 20. If, however, the receiving computing device 10 is unable to launch the ZYXplayer native application, then the receiving computing device 10 may launch the web browser (if not already launched) and transmit a web request to a web server 30 located at the address http://www.ZYXplayer.com, such that the web request includes the username and the playlist identifier parameters. In response to the web request, the ZYXplayer web server 30 can provide playlist 1234 of JohnDoe in the ZYXplayer web application.

Figure 2B:
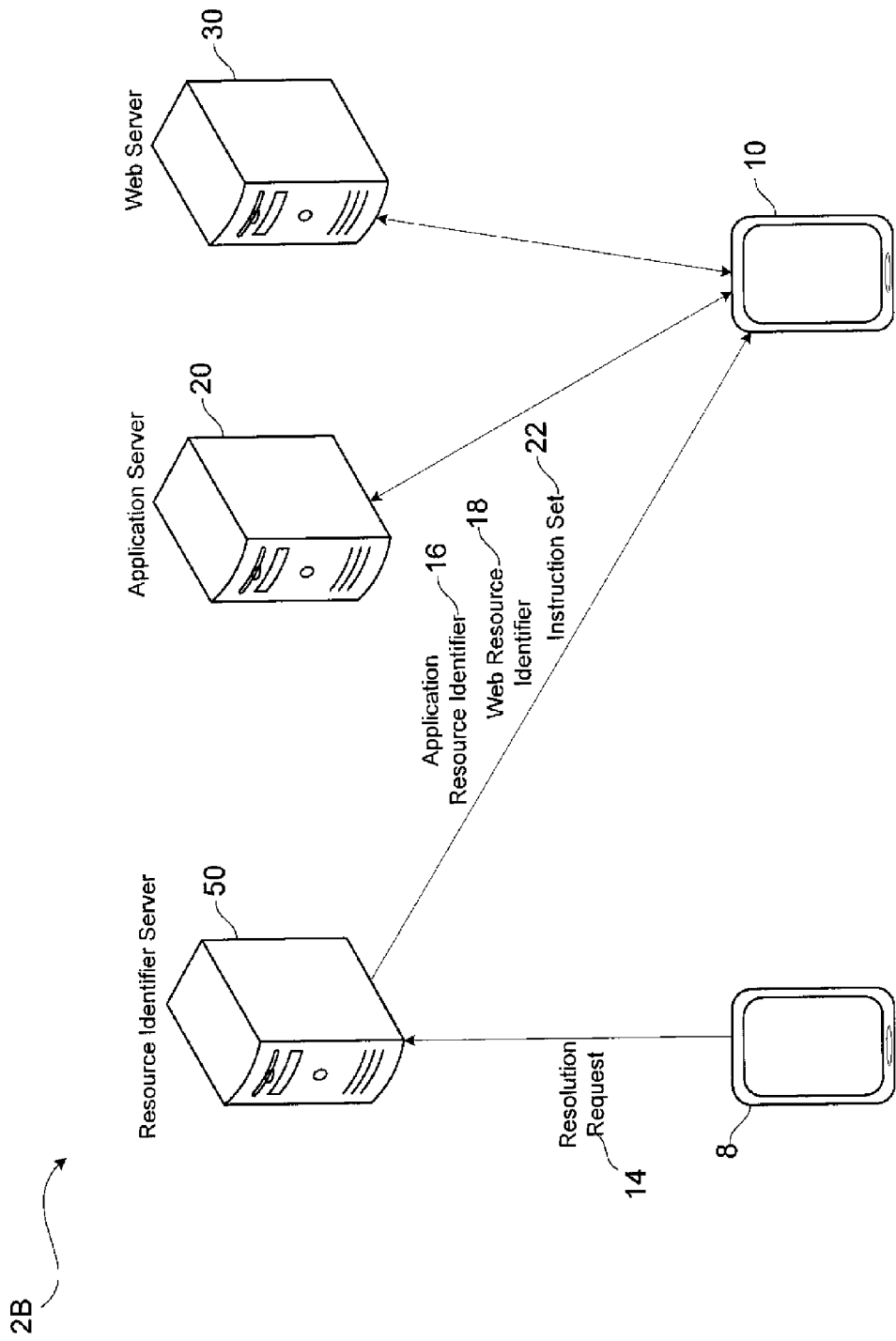

FIG. 2B illustrates an alternate system 2B for sharing an application state between a sending computing device 8 and a receiving computing device 10. In the variation of FIG. 2B, the sending computing device 8 captures the state of an application and sends the resolution request 14 to the resource identifier server 50. The resource identifier server 50 determines the application resource identifiers 16, web resource identifiers 18, and the instruction set 22 and transmits the same to the receiving computing device 10. In this variation, the resolution request 14 further indicates the recipient user or the receiving computing device 10, such that the resource identifier server 50 can know where to transmit the application resource identifiers 16, web resource identifiers 18, and the instruction set 22. The resource identification server 50 may bundle the application resource identifiers 16, web resource identifiers 18, and the instruction set 22 into a script that is sent to the receiving computing device 10 or an email account of the user, such that the user can initiate the script to access the state of the multi-platform application.

FIG. 2C illustrates an alternate system 2C for sharing an application state between a sending computing device 8 and a receiving computing device 10. In the variation of FIG. 2C, the sending computing device 8 captures the state of an application and sends the resolution request 14 to the resource identifier server 50. The resource identifier server 50 determines the application resource identifiers 16, web resource identifiers 18, and the instruction set 22 and transmits the same to back to the sending computing device 8. In this variation, the resolution request 14 does not need to indicate the recipient user or the receiving computing device 10 because the application resource identifiers 16, web resource identifiers 18, and the instruction set 22 are returned to the sending computing device 8. The sending computing device 8, upon receiving the application resource identifiers 16, web resource identifiers 18, and the instruction set 22, may transmit the same to the recipient user or the receiving computing device 10. The resource identification server 50 may bundle the application resource identifiers 16, web resource identifiers 18, and the instruction set 22 into a script that is sent to the sending computing device 8, which in turn can forward the script to the receiving computing device 10.

Figure 2D:
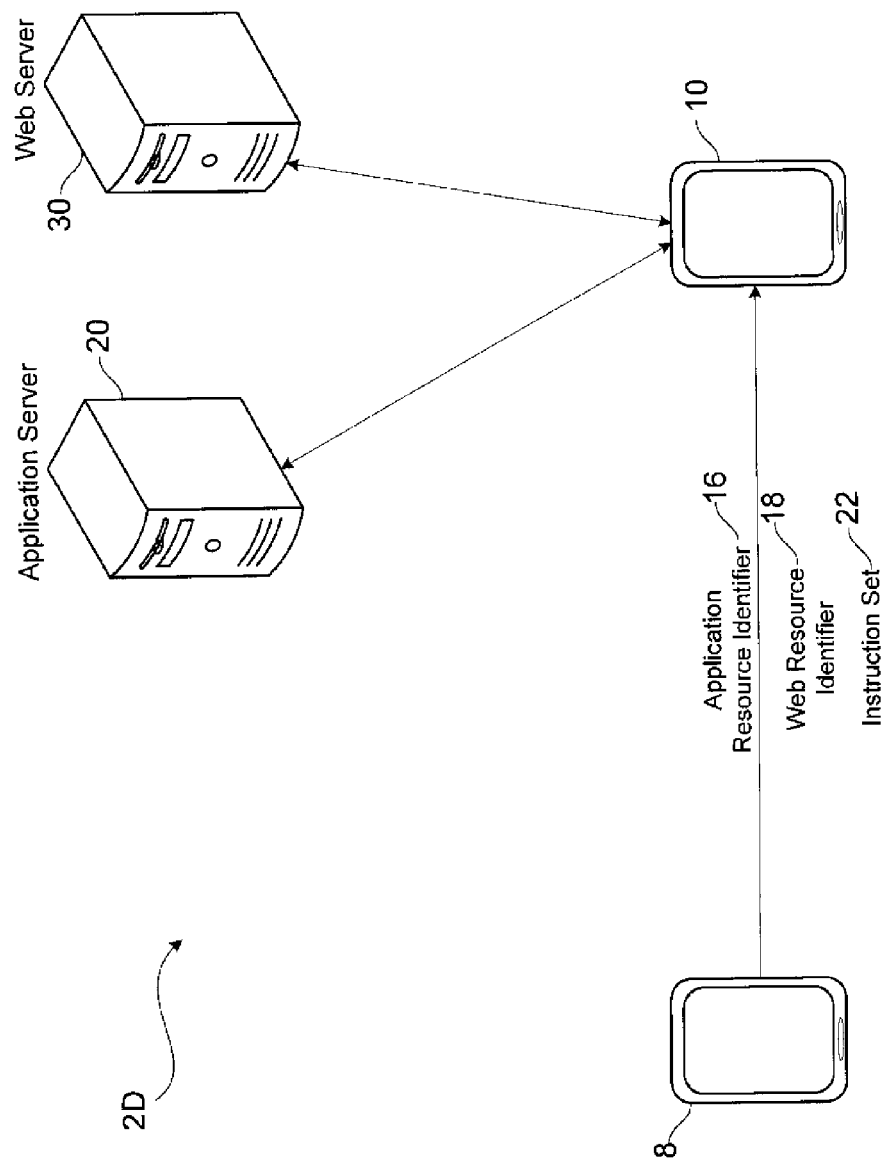

FIG. 2D illustrates an alternate system 2D for sharing an application state between a sending computing device 8 and a receiving computing device 10. In the variation of FIG. 2D, the sending computing device 8 captures the state of an application and determines the application resource identifiers 16, web resource identifiers 18, and the instruction set 22 based on the captured state. Upon determining the application resource identifiers 16, web resource identifiers 18, and the instruction set 22, the sending computing device 8 transmits the same to the receiving computing device 10. The sending computing device may bundle the application resource identifiers 16, web resource identifiers 18, and the instruction set 22 into a script that is sent to the receiving computing device 10.

Figure 2E:
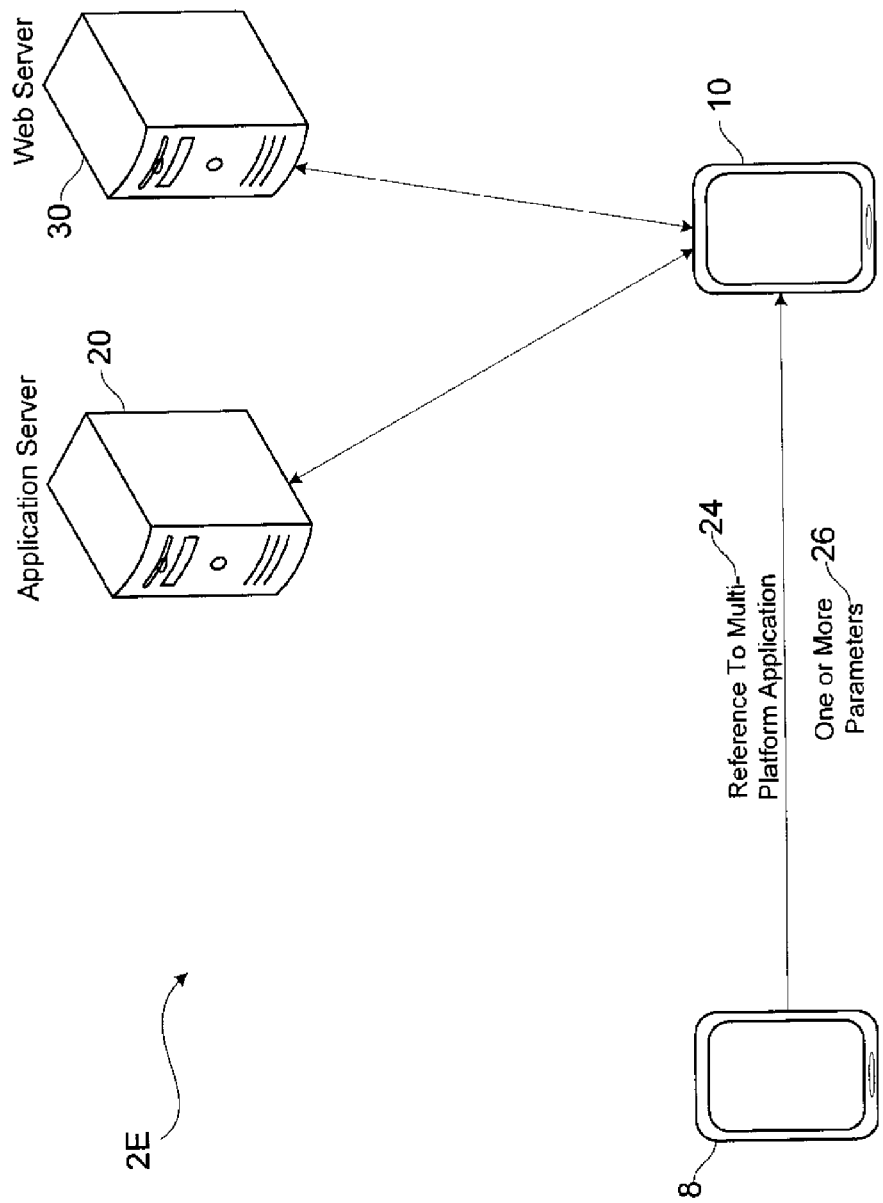

FIG. 2E illustrates an alternate system 2E for sharing an application state between a sending computing device 8 and a receiving computing device 10. In the variation of FIG. 2E, the sending computing device 8 captures the state of an application and sends a reference 24 to the multi-platform application and the one or more parameters 26 indicating the captured state to the receiving computing device 10. The receiving computing device then determines the application resource identifiers 16, web resource identifiers 18, and the instruction set 22 based on the reference 24 to the multi-platform application and the one or more parameters 26.

The foregoing examples are provided for example only and not intended to be limiting. The systems 2A, 2B, 2C, 2D, and 2E can be configured to allow sharing the application states of any type of application. Furthermore, the application resource identifiers 16, the web resource identifiers 18, and the instructions set 22 are provided for example only and not intended to limit the scope of the disclosure.

Figure 3:
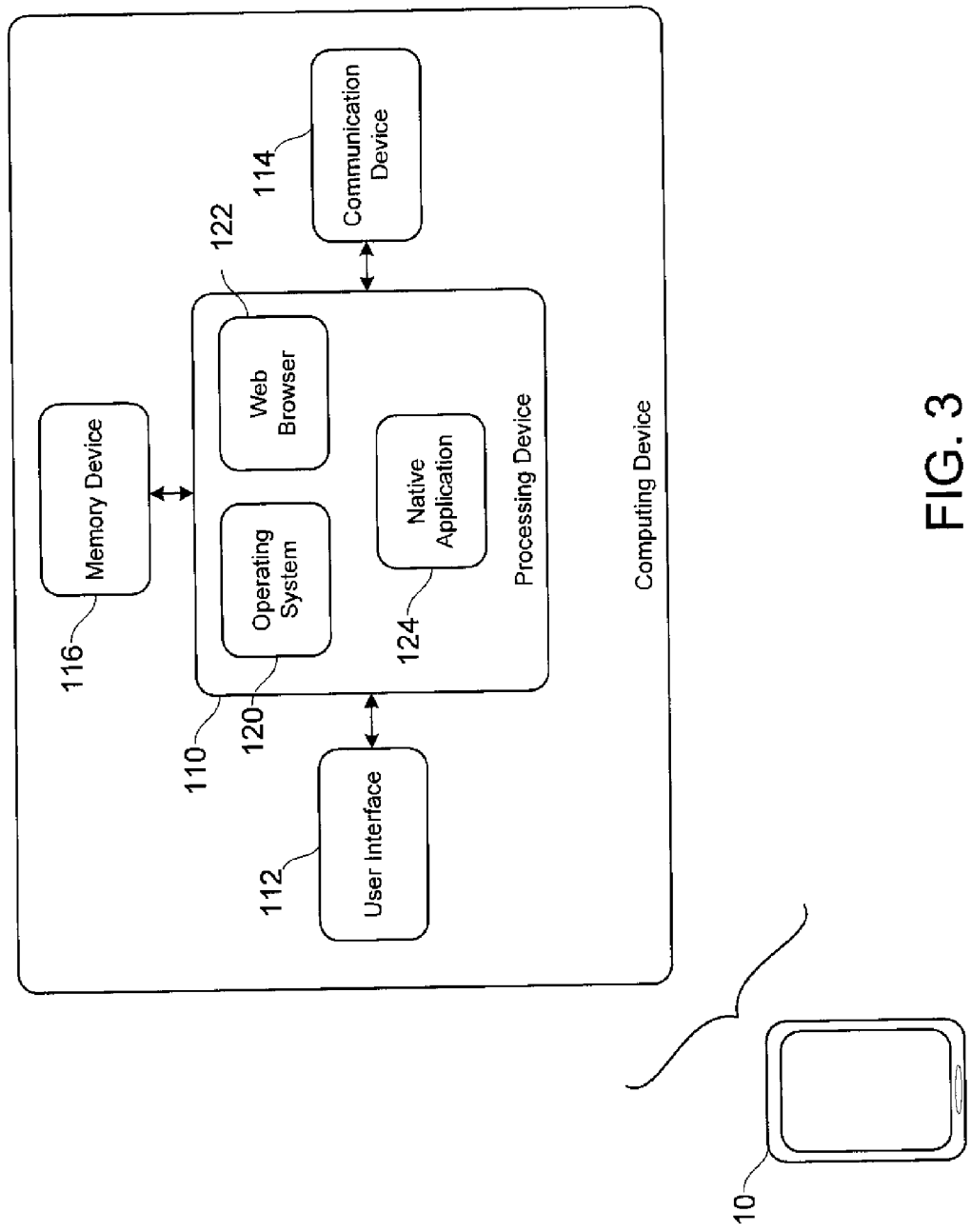
FIG. 3 is a schematic illustrating a computing device configured to access a captured state of an application.

FIG. 3 illustrates an example of a computing device 10 configured to access a captured state of an application. In the illustrated example, the computing device 10 is a mobile computing device that includes a processing device 110, a user interface 112, a communication device 114, and a memory device 116. The computing device 10 may include additional or alternative components as well. While depicted as a mobile computing device, the computing device 10 may alternatively be a stationary computing device or any other suitable computing device.

The processing device 110 includes one or more physical processors and one or more computer-readable mediums (e.g., read only memory and/or random access memory) that store computer-readable instructions that are executed by the one or more processors. In implementations where the processing device 110 includes two or more processors, the processors can execute in a distributed or individual manner. The processing device 110 can execute the operating system 120 of the computing device 10. The operating system 120 can execute a web browser 122 and one or more native applications 124. The operating system 120 is further configured to handle input/output to/from the user interface 112 and the communication device 114. The operating system 120 can also manage the storage of data on the memory device 116.

The user interface 112 can include one or more devices that provide output to a user and/or receive input from the user. The user interface 112 can include, but is not limited to, one or more of a touchscreen, a touchpad, a keyboard, a mouse, a display device, a microphone, and/or a speaker.

The communication device 114 includes one or more suitable devices configured to send and receive data via a network. The communication device 114 can perform wireless or wired communication using any known or later developed communication standards. In some implementations, the communication device 114 can include one or more antennas configured to perform wireless communication using the IEEE 802.11 wireless protocol and/or one or more antennas configured to perform wireless communication according to any of the mobile telecommunication technology standards, e.g., 2G, 3G, or 4G. In some implementations, the communication device 114 includes one or more ports for performing wired communication. The communication device 114 enables the computing device 10 to communicate with application servers 20, web servers 30, the resource identifier server 50, and any other network device.

The memory device 116 can include one or more storage mediums. Examples of storage mediums can include, but are not limited to, hard disk drives, optical disk drives, and flash memory. The memory device 116 can store the computer readable instructions that comprise the native applications 124, as well as any other suitable data.

In operation, the operating system 120 receives a link 12 from another device. As was previously discussed, the link 12 is received in, for example, an email, an SMS message, or in a stand-alone application. Upon receiving the link 12, the operating system 120 may automatically "open" the link 12 in the web browser 122 or the user may select to open the link 12 via the user interface 112.

The web browser 122 parses the link 12 and identifies the domain name of the resource identifier server 50 and the information including a reference to the multi-platform application and one or more parameters indicating the state of the application. The web browser 122 then transmits a resolution request to the resource identifier server 50. The web browser 122 generates the resolution request such that the reference to the multi-platform application and the one or more parameters indicating the state of the application are included in the resolution request. In response to the resolution request, the web browser 122 receives two or more resource identifiers, e.g., an application resource identifier 16 and a web resource identifier 18, and the instruction set 22. As previously discussed, the instruction set 22 can be a set of JavaScript instructions that indicate an order for accessing one of the native application and the web application. For example, the JavaScript instructions may cause the web browser 122 to first attempt to launch the native application indicated in the address resource identifier 16. When the web browser 122 successfully launches the native application 124, the web browser 122 can pass the one or more parameters in the application resource identifier 16 to the native application. The web browser 122, however, may be unsuccessful in attempting to launch the native application 124 if the computing device 10 does not have a version of the native application 124 installed thereon. If the web browser 122 was unable to launch the native application 124, the instruction set 22 may command the web browser 122 to request the web application from the web server indicated in the web resource identifier 18. In some implementations, the instruction set 22 may further command the web browser 122 to display an option to the user to purchase or otherwise obtain the native application. The instruction set 22 may instruct the web browser 122 to perform other actions not explicitly mentioned. Furthermore, the instruction set 22 does not need to be executed by the web browser 122; rather, the instruction set 22 may be executed by the operating system 120 or a native application 124. It is noted that while a web browser 122 is depicted and described, any suitable client that can connect to a web server 30 or an application server 20 can be implemented on the computing device 10 of FIG. 3.

The computing device 10 of FIG. 3 is provided for example only and is not intended to limit the scope of the disclosure. Variations of the computing device 10 are contemplated and are within the scope of the disclosure.

Figure 4:
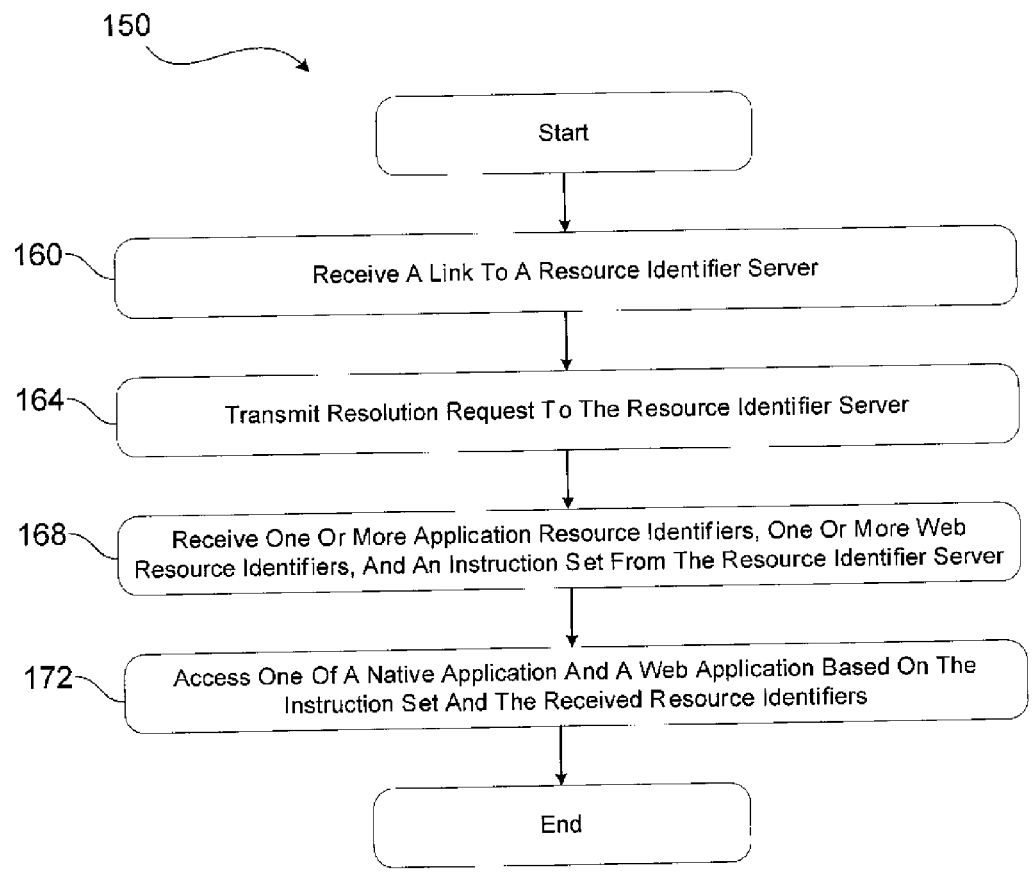
FIG. 4 is a flow chart illustrating an example arrangement of operations of a method for accessing a state of a multi-platform application.

FIG. 4 illustrates an example arrangement of operations for a method 150 for accessing a state of a multi-platform application. In some implementations, the method 150 is executed by the processing device 110 of the computing device 10.

At operation 160, the computing device 10 receives a link 12 to a resource identifier server 50. The link 12 may be received in a communication to a user, e.g., an email, or to the computing device 10, e.g., a SMS message, or may be received by the web browser 122 in, for example, a web page. The link 12 may be or may include a dynamic URL, such that the domain name portion of the dynamic URL references the resource identifier server 50, and the portion following the domain name includes a reference to the multi-platform application and the one or more parameters indicating the state of the application.

At operation 164, the web browser 122 or the operating system 120 transmits a resolution request 14 to the resource identifier server 50. The resolution request 14 includes the reference to the multi-platform application and the one or more parameters indicating the state of the application. In some implementations, the resolution request 14 can further include the type of operating system being executed by the computing device 10. Transmission of the resolution request 14 may be initiated by a user via the user interface 112 of the computing device 10 or automatically by the operating system 120 or the web browser 122.

At operation 168, the web browser 122 or the operating system 120 receives one or more application resource identifiers 16, one or more web resource identifiers 18, and an instruction set 22 from the resource identifier server 50. As discussed previously, the application resource identifiers 16 may include an identifier of a native application and the one or more parameters used to access the state of the application. In some implementations, each application resource identifier 16 may further include the type of operating system for which the identified native application is configured. Additionally or alternatively, each application resource identifier 16 may include a version of the native application. For example, if the native application is offered in a "free version" and a "pay version," one of the application resource identifiers 16 may identify the free version of the native application and another of the application resource identifiers 16 may identify the pay version of the native application.

The web resource identifiers 18 may include a web address of a web server 30 that serves the web application and the one or more parameters used to access the state of the application. In some implementations, each web resource identifier 18 is a dynamic URL, such that the one or more parameters used to access the state are included in the variable portion of the URL. It is noted that the web resource identifier 18 may alternatively or additionally include an IP address of the web server 30 that hosts the web application. In scenarios where the web application can be accessed from a mobile website and a "full-version" website, a first web resource identifier 18 can indicate the web address corresponding to the mobile website and a second web resource identifier 18 can indicate the web address corresponding to the full-version website.

The instruction set 22 can include instructions providing the web browser 122 or the operating system 120 with an order by which to access the native application and the web application. For example, the instruction set 22 can instruct the web browser 122 to first try to launch the pay version of the native application, then to attempt to launch the "free version" if the operating system 120 is unable to launch the pay version of the native application. In this scenario, the instruction set 22 may define the order for opening the application resource identifiers 16. Similarly, the instruction set 22 can instruct the web browser 122 to determine the operating system type and to open the application resource identifier 16 corresponding to the native application configured for the same type of operating system. The instruction set 22 may further instruct the web browser 122 to access a web application, if the operating system 120 is unable to launch the native applications. In some implementations, the instruction set 22 is JavaScript code or other code in another interpreted programming or scripted language. In some implementations, the instruction set 22 is code in a compiled language.

At operation 172, the web browser 122 or the operating system 120 accesses one of the native application and the web application based on the instruction set 22 and the received resource identifiers. For example, the web browser 122 may execute the instruction set 22, e.g., the JavaScript code, and try to launch a native application. If successful, the web browser 122 may pass the one or more parameter values included in the application resource identifier 16 to the launched application. If unsuccessful, the web browser 122 may be instructed to launch the web application. In this scenario, the web browser 122 provides a network request to the web server 30 indicated in the web resource identifier 18, the network request including the one or more parameters indicating the state of the application. By executing the instruction set 22, the computing device is able to access the functionality of the multi-platform application at the state that was initially indicated in the link 12.

The method 150 is provided for example only and not intended to be limiting. Variations of the method are contemplated and are within the scope of the disclosure. For example, the method 150 may be varied such that the computing device 10 does not actually provide the resolution request 14 to the resource identifier server 50. In such implementations, the sending computing device 8 may provide the resolution request to the resource identifier server 50, and the computing device 10 receives the application resource identifiers 16, web resource identifiers 18, and the instruction set 22 from the resource identifier server 50 or from the sending computing device 8.

Figure 5:
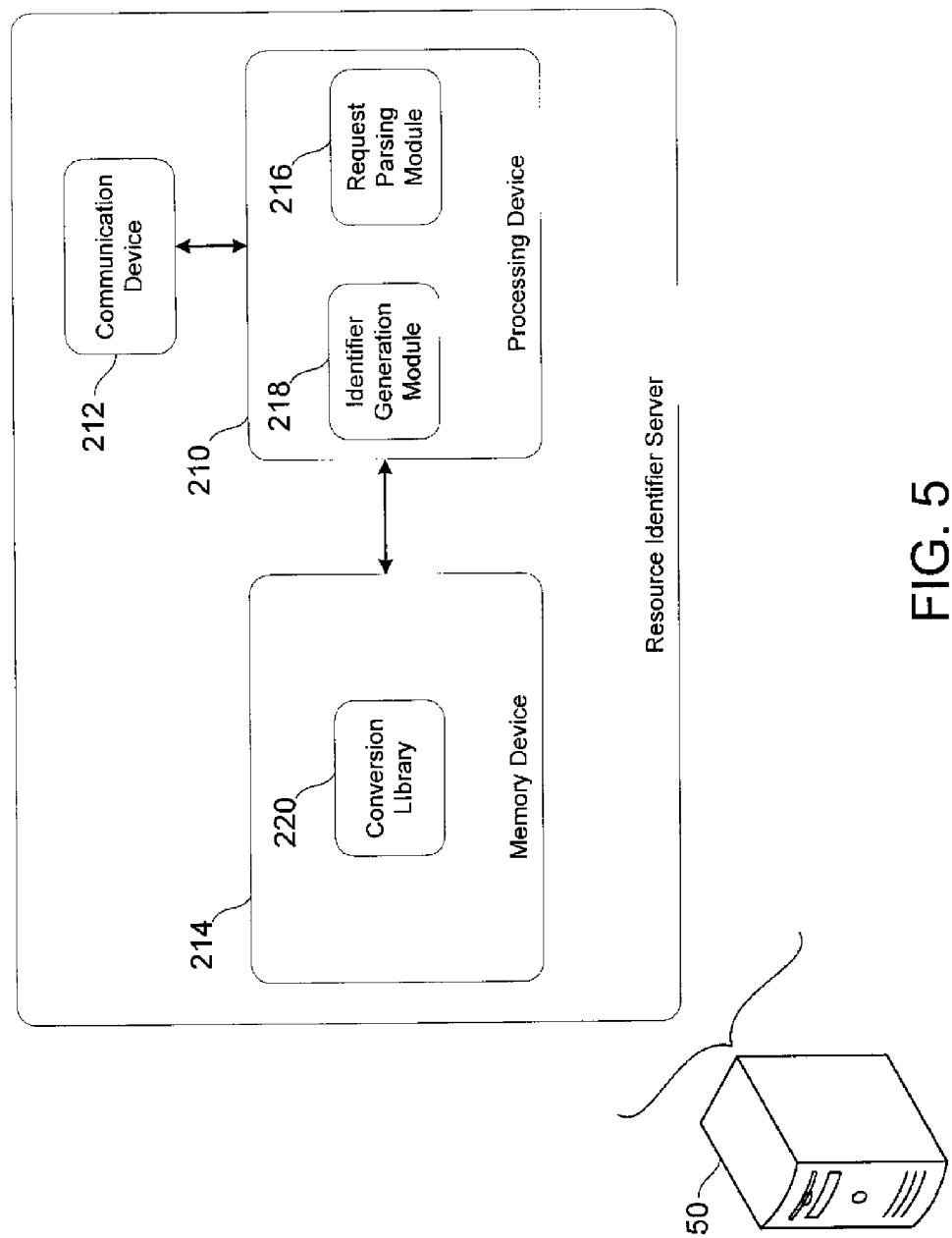
FIG. 5 is a schematic illustrating a resource identifier server configured to determine a plurality of resource identifiers corresponding to a state of a multi-platform application.

Referring now to FIG. 5, an example of the resource identifier server 50 is illustrated. While one resource identifier server 50 is shown, the term "resource identifier server" refers to one or more physical machines operating in an individual or distributed manner. In the illustrated example, the resource identifier server 50 includes, but is not limited to, a processing device 210, a communication device 212, and a memory device 214. The processing device 210 can execute a request parsing module 216 and an identifier generation module 218. The memory device 214 can store a conversion library 220.

The processing device 210 includes one or more physical processors and one or more computer-readable mediums (e.g., read only memory and/or random access memory) that store computer-readable instructions that are executed by the one or more processors. In implementations where the processing device includes two or more processors, the processors can execute in a distributed or an individual manner.

The communication device 212 includes one or more suitable devices configured to send and receive data via a network. The communication device 212 can perform wired and/or wireless communication using any known or later developed communication standards.

The memory device 214 can include one or more storage mediums. Examples of storage mediums can include, but are not limited to, hard disk drives, optical disk drives, magnetic tape drives, and flash memory. As mentioned, the memory device stores the conversion library 220. The conversion library 220 can store templates or transforms for generating resource identifiers. A template can define the structure of a resource identifier corresponding to a native or web application and includes one or more parameter fields accepted by the application and that are populated by parameter values. For instance, a template for generating an application resource identifier 16 for the ZYXplayer native application may have the following format: ZYXplayer::<Operating_System>::username=<username>&playlist=<playlist_number>, where <Operating_System>, <username>, and <playlist_number> are the parameter fields that are populated with actual parameter values. Similarly, the template for generating a web resource identifier 18 corresponding to the ZYXplayer web application may have the following format: http://www.ZYXplayer.com/username=<username>&playlistid=<playlist_number>. In some implementations, the templates may include rules which define various attributes of the template or the parameter values of the fields. For example, a rule may define the acceptable values of a particular parameter. It is noted that the templates or transforms may be broken up into prefix portions and the dynamic portions or "web tail" portions. Furthermore, the formats provided by the disclosure are provided for example only and not intended to limit the scope of the disclosure.

Each application developer of a multi-platform application can register data corresponding to the multi-platform application, including the templates for generating resource identifiers, the rules for using the templates, and additional metadata corresponding to the multi-platform application. For example, an application developer may register a name of the multi-platform application, a format of an application resource identifier 16, a format of a web resource identifier 18, the name of the native application as it is to appear in an application resource identifier 16, the operating systems on which the native application is configured to execute, the domain name of a web server that serves the web application, the different types of parameters that can be included in a resource identifier, and/or the acceptable variable types of the different types of parameters. In some implementations, the conversion library 220 is implemented as a database, such that the conversion library 220 is searchable at least by multi-platform application name. In response to receiving a query for a particular multi-platform application, the conversion library 220 can return rules and/or templates for generating the resource identifiers for the particular multi-platform application.

In some implementations, the conversion library 220 may further store instruction sets 22 or instruction set templates for generating instruction sets 22. In these implementations, each developer may provide instructions for accessing the state of the multi-platform application. For example, each developer may submit JavaScript code that defines how a web browser 122 or operating system 120 is to access the state of the multi-platform application. In these scenarios, the instruction set 22 can be stored in conversion library 220 and may be linked to the entry for its corresponding multi-platform application. In some implementations, the instruction set 22 is a generic set of instructions that can be used for any multi-platform application. Pseudo code examples of a generic instruction set are provided below:

Parse application resource identifier;
Identify native application name from the application resource identifier;
Identify one or more parameters from the application resource identifier;
Launch native application with the one or more parameters;
If native application successfully launched, then end script;

Else, transmit web request to web address indicated in the web resource identifier;
End;
In another example, the resource identifier server 50 may determine multiple application resource identifiers 16, such that each application resource identifier 16 corresponds to a different operating system type. A pseudo code example for this scenario is provided below:
Determine operating system type of the device;
Identify application resource identifier having the operating system type;
Parse the identified application resource identifier;
Identify native application name from the application resource identifier;
Identify one or more parameters from the application resource identifier;
Launch native application with the one or more parameters;
If native application successfully launched, then end script;
Else, transmit web request to web address indicated in the web resource identifier;
End;
The foregoing pseudo code examples are provided for example only and not intended to be limiting. The examples may be implemented as instruction sets 22 in any suitable programming or scripting language.

In operation, the request parsing module 216 receives a resolution request from a computing device 10 via the communication device 212. In response to receiving the resolution request, the request parsing module 216 extracts the reference, e.g., name, of the multi-platform application and the one or more parameters from the resolution request.

The identifier generation module 218 generates application resource identifiers 16 and web resource identifiers 18. In some implementations, the identifier generation module 218 obtains the reference to the multi-platform application and the one or more parameters from the request parsing module 216. The identifier generation module 218 queries the conversion library 220 with the reference to the multi-platform application. The conversion library 220 returns templates corresponding to the multi-platform application. In some implementations, the conversion library 220 returns a template for each possible resource identifier that can be generated for a particular multi-platform application. For instance, if the ZYXplayer application includes native applications for iOS and ANDROID, the conversion library 220 may return a first template for generating an application resource identifier for an iOS version of the native application, a second template for generating an application resource identifier for the ANDROID version of the native application, and a third template for generating a web resource information for the web application version of the ZYX player application. Alternatively, the conversion library 220 may return a single template for an application resource identifier 16, whereby the identifier generation module 218 can generate multiple application resource identifiers 16 by populating a parameter field defining the operating system type with the various operating systems on which the native application can execute. Upon obtaining the templates, the identifier generation module 218 generates the various resource identifiers by populating the parameter fields of the templates with the one or more parameter values extracted from the resolution request.

The identifier generation module 218 can further determine the instruction set 22 to transmit with the resource identifiers. The instructions set 22 may be a generic instruction set 22 or an instruction set 22 specific to the multi-platform application. Furthermore, in some implementations the identifier generation module 218 may be configured to insert the one or more address resource identifiers and the one or more web resource identifiers into the instruction set 22. The identifier generation module 218 can transmit the one or more application resource identifiers 16, the one or more web resource identifiers 18, and the instruction set 22 to the requesting computing device 10 via the communication device 212.

The resource identifier server 50 of FIG. 5 is provided for example only and is not intended to limit the scope of the disclosure. Variations of the resource identifier server 50 are contemplated and are within the scope of the disclosure.

Figure 6:
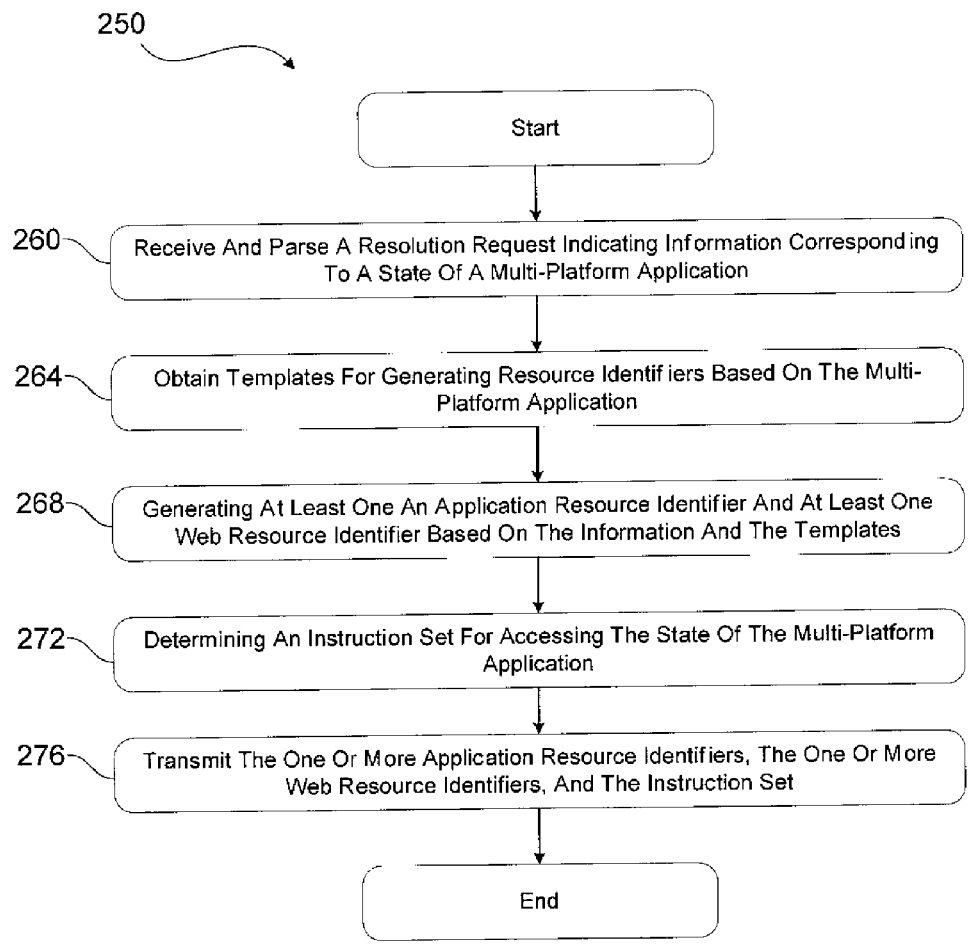
FIG. 6 is a flow chart illustrating an example arrangement of operations of a method for determining resource identifiers corresponding to a state of a multi-platform application.

FIG. 6 illustrates an example arrangement of operations for a method 250 for determining resource identifiers corresponding to a state of a multi-platform application. In some implementations, the method 250 is executed by the processing device 210 of the resource identifier server 50.

At operation 260 the request parsing module 216 receives and parses the resolution request 14. As previously discussed, the resolution request 14 includes information defining a reference to the multi-platform application and the one or more parameters indicating the state of the application. The request parsing module 216 can identify the reference to the multi-platform application as well as the one or more parameters, which it can provide to the identifier generation module 218.

At operation 264, the identifier generation module 218 obtains templates for generating the resource identifiers. The identifier generation module 218 can query the conversion library 220 with the reference to the multi-platform application. The conversion library 220 returns templates corresponding to the multi-platform application, and in some embodiments, rules applying to the templates.

At operation 268, the identifier generation module 218 generates at least one application resource identifier 16 and at least one web resource identifier 18 based on the information and the templates. As previously discussed, each template includes at least one parameter field. Thus, the identifier generation module 218 populates the parameter fields of each retrieved template with the one or more parameter values received in the resolution request 14. In the scenario where an application developer offers native applications which execute on different operating systems, the identifier generation module 218 can generate more than one application resource identifier 16, such that each application resource identifier 16 corresponding to a different version of the native application. Similarly, where an application developer maintains a mobile website and a "full version" website, the identifier generation module 218 may generate a first web resource identifier 18 corresponding to the mobile website and a second web resource identifier 18 corresponding to the full version website.

At operation 272, the identifier generation module 218 determines the instruction set 22 for accessing the state of the multi-platform application. As previously discussed, the instruction set 22 may be a generic instruction set pertaining to any number of multi-platform applications. In these implementations, the identifier generation module 218 retrieves the generic instruction set from the memory device 214. In implementations where each instruction set 22 is configured for a particular multi-platform application, the identifier generation module 218 may retrieve the instruction set 22 pertaining to the multi-platform application from, for example, the conversion library 220. In some implementations, the identifier generation module 218 may further insert the generated resource identifiers into the instruction set 22.

At operation 276, the identifier generation module 218 transmits the one or more application resource identifiers 16, the one or more web resource identifiers 18, and the instruction set 22 to the computing device 10.

The method 250 of FIG. 6 is provided for example only and not intended to be limiting. Furthermore, variations of the method 250 are contemplated and are within the scope of the disclosure. For example, the method 250 can be modified to be executed on a user computing device 10. In such implementations, the user computing device 10 can receive the reference to the multi-platform application and the one or more parameters from a sending computing device 8 and may generate the resource identifiers off-line. In such implementations, the conversion library 220 and the identifier generation module 218 may be executed by the processing device 110 of the computing device 10.

As previously discussed, a user computing device 10 or 8 may be configured to determine resource identifiers corresponding to an application state. For example, FIG. 2E illustrates a user computing device 10 that is configured to determine one or more resource identifiers corresponding to an application state. In these implementations the user computing device 10 can execute a client, e.g., a web browser or an application resource identifier client. The user computing device 10 can receive a reference 24 to a multi-platform application and one or more parameters 26 indicating a state of the application. In some implementations, the reference 24 and the parameters 26 can be received in the form of a dynamic URL. The user computing device 10 can determine an application resource identifier based on the reference 24 and the parameters 26. For example, the computing device 10 may receive a reference to the ZYX-player application and one or more parameters. Based on the reference, a client of the computing device 10 can generate an application resource identifier and launch the ZYXplayer native application.

In some of these implementations, the user computing device 10 can transmit a web request to a web server 30 indicated by the reference 24. The web request can include a path of an instruction set, e.g., JavaScript code, in the file system of the web server 30. In response to receiving the web request, the web server 30 provides the instruction set stored at the location indicated by the path to the user computing device 10. The user computing device 10 receives the instruction set and generates the application resource identifier based on the instruction set and the received parameters 26. The user computing device 10 can then attempt to access the application using the application resource identifier or the web resource identifier.

The instruction set may provide a transform that includes a format or a template for generating an application resource identifier. Further, the transform can include a format or template for generating a web resource identifier. A transform can be an object that includes the formats or templates for generating the resource identifiers. For example, a transform may include a template for generating application resource identifiers, including how to parse the parameters from a web resource identifier and format the parameters 26 into an application resource identifier. The instruction set can also include the following fields: a name of the application; a web prefix corresponding to the web application; a native prefix corresponding to the native application; a title of the transform; a description of the transform of a home page that identifies a web resource identifier of a home page for the applications; an icon identifier that identifies an icon image for an underlying application; and various edition data. The web prefix can provide the root of a web resource identifier, e.g., the domain name corresponding to the web application. In some implementations, the web prefix can match the resource identifier to which the web request is transmitted. The native prefix is the root of the application resource identifier. The native prefix indicates the native application that is to be launched. The edition data may include a download resource identifier indicating the page where users can download the application, the operating systems that various editions of the native application have been programmed for, names of each edition, and an icon resource identifier for each edition.

Figure 7:
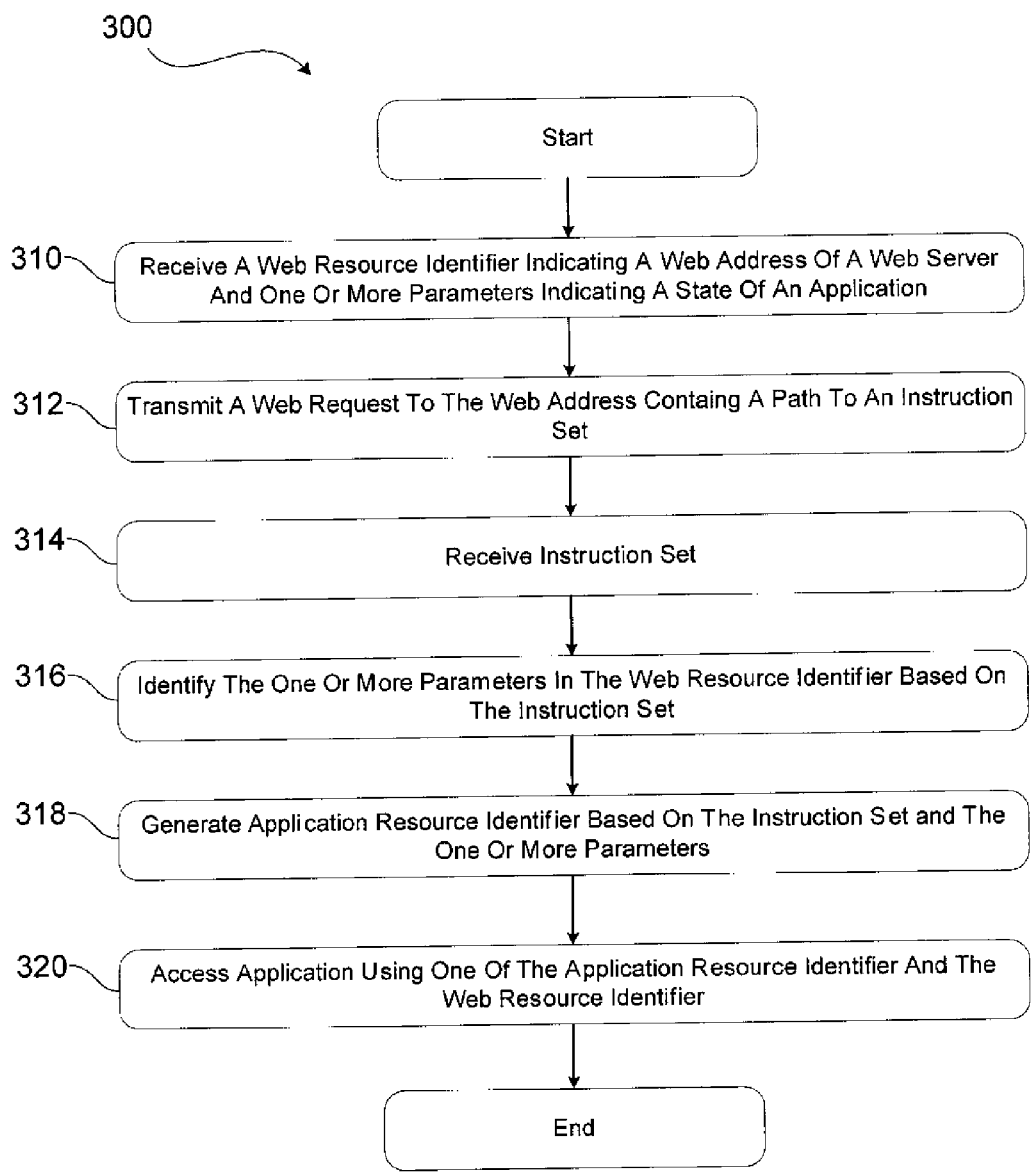
FIG. 7 is a flow chart illustrating an example arrangement of operations of a method for determining an application resource identifier corresponding to a state of a multi-platform application.

FIG. 7 illustrates an example set of operations of a method 300 for accessing a state of an application that may be executed by a user computing device 10, and in particular, a client (e.g., web browser 122) associated with the user computing device 10. While for purposes of explanation reference is made to a web browser 122, a client may refer to, for example, an operating system level API function, a programming library function, a web browser 122, an add-on, extension, or plug-in for a web browser 122, a JavaScript program executing on an application's website that runs at load-time and retroactively attempts to open the web page's URL in a native application, and/or a JavaScript function on a web page that intercepts click events on hyperlinks pointing to a particular applications domain.

At operation 310, the user computing device 10 receives a web resource identifier. The web resource identifier may be received from another user computing device 8 or from a remote server, e.g., a search engine. The web resource identifier can include a web address of a web server and one or more parameters indicating a state of an application. For example, the user computing device 10 may receive a web resource identifier of a micro-blogging application for grape-related topics, e.g., http://grapes.example.com/concord.html?u=Jenny&c=red. In this example, the micro-blogging application is also accessible via a native application.

At operation 312, the web browser 122 can generate a web request to the web address of the web server. The web request can include a path to an instruction set. For example, the web browser 122 may include the path "appurl.json" in the web request, such that the web resource identifier of the instruction set is a static URL in the form of http://grapes.example.com/appurl.json. It is noted that in some implementations, web servers may reserve a predetermined path to the instruction set, e.g., appurl.json, such that the instruction set of any web server can be accessed at [domain_name]/appurl.json.

At operation 314, the web browser 122 receives an instruction set from the web server. As previously mentioned, the instruction set may include a web prefix, a native prefix, and one or more transforms. In the example of the grape micro-blogging application, the instruction set may include the following:

```
{
    "webPrefix": "http://grapes.example.com/",
    "nativePrefix": "grapes.example.com:pages/"
    "transforms": {
        "web": "{page}.html?c={color}&u={user}"
        "native": "{page}/{user}?col={color}"
    }
}
```

The instruction set includes a definition of the web prefix, the native prefix, and a transform. In this example, the parameters that are received by the grape micro-blogging application include a page, a user, and a color. The transform provides the format or template for including the parameters in an application resource identifier and in a web resource identifier. The foregoing instruction set is provided for example only.

At operation 316, the web browser 122 identifies the parameters in the web resource identifier based on the instruction set. In some implementations, the web browser 122 identifies the domain name portion of the web resource identifier based on the web prefix field contained in the instruction set. The remaining portion of the web resource identifier, e.g., the "dynamic" portion of the web resource identifier or the "web tail," can be isolated from the domain name portion. The web browser 122 can scan the web tail of the web resource identifier to determine the various parameter values based on the format of a web tail portion of the web resource identifier defined in the transform. In the continuing example, the web browser 122 can infer that the grape micro-blogging application receives a "page" parameter, a "color" parameter, and a "user" parameter. Furthermore, in the received web resource identifier, the parameter values are page="concord;" color="red;" and user="Jenny."

At operation 318, the web browser 122 can generate an application resource identifier based on the instruction set and the one or more parameters. The web browser 122 can replace the dynamic portion of the web resource identifier with the native prefix of the application. In the continuing example, the web browser 122 can replace "http://grapes.example.com/" with "grapes.example.com:pages/." Put another way, the web browser 122 can generate the static portion of the application resource identifier based on the native prefix defined in the instruction set. The web browser 122 can insert the parameter values into the format of the web tail portion of the native application defined in the transform. Continuing the example from above, the web tail portion of the native application may be in the form of "concord/Jenny?col=red." The web browser 122 can generate the application resource identifier by amending the web tail to the native prefix. In this example, the application resource identifier is: "grapes.example.com:pages/concord/Jenny?col=red."

At operation 320, the web browser 122 accesses the application at a state indicated by the one or more parameters. The web browser 122 may first attempt to launch a native application using the application resource identifier. If unsuccessful, the web browser 122 can access the web application using the received web resource identifier. In some implementations, the instruction set can include the order by which the web browser 122 attempts to access the application. For example, if the transform includes more than one native prefixes, e.g., transforms of different editions of the native application, then the instruction set may include instructions for attempting to launch a first native application, e.g., a pay version of the application, before attempting to launch a second native version, e.g., a free version of the application, and if both attempts are unsuccessful, to access the web application.

It is noted that while the techniques described with respect to FIG. 7 are described with respect to a user computing device, the techniques may also be implemented by the resource identifier server 50. Furthermore, while the operations of FIG. 7 are described with respect to a web browser 122, it is noted that the operations may be performed by any suitable client. For instance, the operations may be performed by an application resource identifier client that is configured to open application resource identifiers.

As was described, in some implementations, a client on a computing device 10 receives instructions (e.g., a json file) for generating an application resource identifier. In these implementations, the instructions can be delivered from the web server of the application provider (as discussed in the implementations of FIG. 7) or can be delivered from a third party (e.g., the resource identifier server 50 of FIG. 5).

It is noted that the present disclosure further relates to broadening the current resource identifying schemes to include native applications. In this way, operating systems may implement http-triggered application launching. According to http-triggered application launching, the operating system may be configured to automatically launch an application without performing a transformation. For example, in the Android operating system, an application configured for Android can utilize the intents feature to perform http-triggered application launching. In another example, applications programmed for the BlackBerry application can register invocation filters to perform http-triggered application launching. In this way, a single referencing scheme, e.g., static and dynamic URLs, can be used to launch native applications akin to the way a client uses a static or dynamic URL to visit a web page.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
    receiving, at a processing device, a resolution request, the resolution request including information indicating a state of a multi-platform application and including one or more parameter values corresponding to the state of the multi-platform application;
    generating, at the processing device, an application resource identifier based on the information, the application resource identifier being configured to access the state of the multi-platform application via a native application corresponding to the multi-platform application, the native application being executable by a remote computing device, wherein generating the application resource identifier includes:
        obtaining, at the processing device, an application resource identifier template corresponding to the multi-platform application, the application resource identifier template including one or more application resource identifier parameter fields; and
        populating, at the processing device, the one or more application resource identifier parameter fields with the one or more parameter values included in the information;
    generating, at the processing device, a web resource identifier based on the information, the web resource identifier being configured to access the state of the multi-platform application via a web application executed by a web browser of the remote computing device, wherein generating the web resource identifier includes:
        obtaining, at the processing device, a web resource identifier template corresponding to the multi-platform application, the web resource identifier template including one or more web resource identifier parameter fields; and
        populating, at the processing device, the one or more web resource identifier parameter fields with the one or more parameter values included in the information;
    determining, at the processing device, an instruction set indicating instructions to access at least one of the native application or the web application; and
    transmitting, at the processing device, the application resource identifier, the web resource identifier, and the instruction set to the remote computing device.

2. The method of claim 1, wherein the state of the multi-platform application is represented by one or more parameter values, the one or more parameter values being included in the information.

3. The method of claim 1, wherein the web resource identifier is a dynamic uniform resource locator.

4. The method of claim 1, wherein the instruction set indicates an order for the remote computing device to attempt to access the native application and the web application.

5. The method of claim 4, wherein the instruction set instructs the remote computing device to access the web application indicated in the web resource identifier only after unsuccessfully attempting to launch the native application indicated in the application resource identifier.

6. The method of claim 1, wherein the application resource identifier is one of a plurality of application resource identifiers that are generated based on the information, each of the plurality of application resource identifiers corresponding to a version of the native application configured to execute on a different operating system.

7. The method of claim 1, wherein the resolution request is received from the remote computing device.

8. A server comprising:
    a communication device configured to communicate with a network; and
    a processing device in communication with the communication device and configured to:
        receive a resolution request, the resolution request including information indicating a state of a multi-platform application and including one or more parameter values corresponding to the state of the multi-platform application;
        generate an application resource identifier based on the information, the application resource identifier being configured to access the state of the multi-platform application via a native application corresponding to the multi-platform application, the native application being executable by a remote computing device, wherein generating the application resource identifier includes:
            obtaining, from a conversion library, an application resource identifier template corresponding to the multi-platform application, the application resource identifier template including one or more application resource identifier parameter fields; and
            populating the one or more application resource identifier parameter fields with the one or more parameter values included in the information;
        generate a web resource identifier based on the information, the web resource identifier configured to access the state of the multi-platform application via a web application executed by a web browser of the remote computing device, wherein generating the web resource identifier includes:
            obtaining, from a conversion library, a web resource identifier template corresponding to the multi-platform application, the web resource identifier template including one or more web resource identifier parameter fields; and
            populating the one or more web resource identifier parameter fields with the one or more parameter values included in the information;
        determine an instruction set indicating instructions to access at least one of the native application and the web application; and
        transmit the application resource identifier, the web resource identifier, and the instruction set to the remote computing device.

9. The server of claim 8, wherein the state of the multi-platform application is represented by one or more parameter values, the one or more parameter values being included in the information.

10. The server of claim 8, wherein the web resource identifier is a dynamic uniform resource locator.

11. The server of claim 8, wherein the instruction set indicates an order for the remote computing device to attempt to access the native application and the web application.

12. The server of claim 11, wherein the instruction set instructs the remote computing device to access the web application indicated in the web resource identifier only after unsuccessfully attempting to launch the native application indicated in the application resource identifier.

13. The server of claim 8, wherein the processing device is configured to generate a plurality of application resource identifiers, including the application resource identifier, each of the plurality of application resource identifiers corresponding to a version of the native application configured to execute on a different operating system.

14. The server of claim 8, wherein the resolution request is received from the remote computing device.

15. A method for accessing a specified state of a multi-platform application, the multi-platform application at least including a native application executable by a computing device and a web application executed by a web browser of the computing device, the method comprising:
receiving, at a processing device of the computing device, a link to a resource identifier server, the link including a first web address of the resource identifier server and information indicating a state of the multi-platform application;
transmitting, from the processing device, a resolution request to the resource identifier server based on the link, the resolution request including the information and requesting a plurality of resource identifiers corresponding to the multi-platform application;
receiving, at the processing device from the resource identifier server, an application resource identifier, a web resource identifier, and an instruction set from the resource identifier server in response to the resolution request, the application resource identifier being configured to access the state of the multi-platform application via the native application, the web resource identifier being configured to access the state of the multi-platform application via the web application, and the instruction set indicating a process to access the multi-platform application; and
accessing, at the processing device, one of the native application and the web application based on the instruction set, the application resource identifier, and the web resource identifier.

16. The method of claim 15, wherein the state is represented by one or more parameter values, the one or more parameter values being included in the link, the resolution request, the application resource identifier, and the web resource identifier.

17. The method of claim 15, wherein the web resource identifier is a dynamic uniform resource locator.

18. The method of claim 15, wherein the instruction set indicates an order for the processing device to attempt to access the native application and the web application.

19. The method of claim 18, wherein the instruction set instructs the processing device to access the web application indicated in the web resource identifier only after unsuccessfully attempting to launch the native application indicated in the application resource identifier.

20. The method of claim 15, wherein the application resource identifier is one of a plurality of application resource identifiers that are received in response to the resolution request, each of the plurality of application resource identifiers corresponding to a version of the native application configured to execute on a different operating system.

21. The method of claim 20, wherein the instruction set instructs the processing device to determine an operating system being executed by the processing device and to attempt to launch the application resource identifier corresponding to the operating system.

22. A method comprising:
receiving, at a processing device, information corresponding to a state of a multi-platform application and including one or more parameter values corresponding to the state of the multi-platform application;
generating, at the processing device, an application resource identifier based on the information, the application resource identifier being configured to access the state of the multi-platform application via a native application corresponding to the multi-platform application, the native application being executable by the processing device, wherein generating the application resource identifier includes:
obtaining, at the processing device, an application resource identifier template corresponding to the multi-platform application, the application resource identifier template including one or more application resource identifier parameter fields; and
populating, at the processing device, the one or more application resource identifier parameter fields with the one or more parameter values included in the information;
generating, at the processing device, a web resource identifier based on the information, the web resource identifier being configured to access the state of the multi-platform application via a web application executed by a web browser of a remote computing device, wherein generating the web resource identifier includes:
obtaining, at the processing device, a web resource identifier template corresponding to the multi-platform application, the web resource identifier template including one or more web resource identifier parameter fields; and
populating, at the processing device, the one or more web resource identifier parameter fields with the one or more parameter values included in the information;
determining, at the processing device, an instruction set indicating instructions to access at least one of the native application and the web application; and
accessing, at the processing device, one of the native application and the web application based on the instruction set, the application resource identifier, and the web resource identifier.

23. The method of claim 22, wherein the state of the multi-platform application is represented by one or more parameter values, the one or more parameter values being included in the information.

24. The method of claim 22, wherein the instruction set indicates an order for the processing device to attempt to access the native application and the web application.

25. The method of claim 24, wherein the instruction set instructs the processing device to access the web application indicated in the web resource identifier only after unsuccessfully attempting to launch the native application indicated in the application resource identifier.

26. A method comprising:
receiving, at a processing device, a web resource identifier configured to access a particular state of a web application corresponding to a multi-platform application, the web resource identifier including one or more parameters indicating the particular state;
obtaining, at the processing device, a conversion instruction set corresponding to the multi-platform application based on a first portion of the web resource identifier, the conversion instruction set defining instructions to convert web resource identifiers configured for the web application to application resource identifiers configured for one or more native applications corresponding to the multi-platform application;
determining, at the processing device, one or more parameter values based on the web resource identifier and the conversion instruction set; and
generating, at the processing device, an application resource identifier based on the conversion instruction set and the one or more parameter values, the application resource identifier being configured to access a native application of the one or more native applications corresponding to the multi-platform application.

27. The method of claim 26, further comprising, accessing one of the native application and the web application based on the application resource identifier and the web resource identifier.

28. The method of claim 26, wherein obtaining the conversion instruction set includes:
generating, at the processing device, a web request for a web server based on the first portion of the web resource identifier and a predetermined path;
transmitting, at the processing device, the web request to the web server; and
receiving, at the processing device, the conversion instruction set.

29. The method of claim 26, wherein the conversion instruction set indicates a web prefix indicating a first format of static portion of the web resource identifier, a native prefix indicating a second format of a static portion of the application resource identifier, and a transform, the transform indicating a third format of a web tail of web resource identifiers and a fourth format of a web tail of the application resource identifier, wherein the third and fourth formats respectively indicate locations of the one or more parameters in each respective web tail.

30. The method of claim 29, wherein determining the one or more parameter values includes:
identifying, at the processing device, the one or more parameters in the web resource identifier based on the third format; and
determining, at the processing device, the parameter value of each of the identified parameters.

31. The method of claim 29, wherein generating the application resource identifier includes:
inserting, at the processing device, the one or more parameter values into the web tail based on the fourth format; and
amending, at the processing device, the web tail to the native prefix.

32. A computing device comprising:
a communication device; and
a processing device in communication with the communication device and configured to:
receive a web resource identifier configured to access a particular state of a web application corresponding to a multi-platform application, the web resource identifier including one or more parameters indicating the particular state;
obtain a conversion instruction set corresponding to the multi-platform application based on a first portion of the web resource identifier, the conversion instruction set defining instructions to convert web resource identifiers configured for the web application to application resource identifiers configured for one or more native applications corresponding to the multi-platform application;
determine one or more parameter values based on the web resource identifier and the conversion instruction set; and
generate an application resource identifier based on the conversion instruction set and the one or more parameter values, the application resource identifier configured to access a native application of the one or more native applications corresponding to the multi-platform application.

33. The computing device of claim 32, wherein the computing device is further configured to access one of the native application and the web application based on the application resource identifier and the web resource identifier.

34. The computing device of claim 33, wherein the computing device is a user computing device.

35. The computing device of claim 32, wherein the processing device obtains the conversion instruction set by:
generating a web request for a web server based on the first portion of the web resource identifier and a predetermined path;
transmitting the web request to the web server; and
receiving the conversion instruction set.

36. The computing device of claim 32, wherein the conversion instruction set indicates a web prefix indicating a first format of static portion of the web resource identifier, a native prefix indicating a second format of a static portion of the application resource identifier, and a transform, the transform indicating a third format of a web tail of web resource identifiers and a fourth format of a web tail of the application resource identifier, wherein the third and fourth formats respectively indicate locations of the one or more parameters in each respective web tail.

37. The computing device of claim 36, wherein the processing device determines the one or more parameter values by:
identifying the one or more parameters in the web resource identifier based on the third format; and
determining the parameter value of each of the identified parameters.

38. The computing device of claim 36, wherein the processing device generates the application resource identifier by:
inserting the one or more parameter values into the web tail based on the fourth format; and
amending the web tail to the native prefix.

* * * * *